US008666784B2

(12) United States Patent
Stepeck et al.

(10) Patent No.: US 8,666,784 B2
(45) Date of Patent: Mar. 4, 2014

(54) SYSTEMS AND METHODS FOR ADMINISTERING COMPREHENSIVE PROTECTION PLANS

(75) Inventors: Carin Lynn Stepeck, Unionville, CT (US); Henry J. Winter, Glastonbury, CT (US); Stanley Michael Harasimowitz, Colchester, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 87 days.

(21) Appl. No.: 12/816,551

(22) Filed: Jun. 16, 2010

(65) Prior Publication Data

US 2011/0093299 A1    Apr. 21, 2011

Related U.S. Application Data

(60) Provisional application No. 61/252,887, filed on Oct. 19, 2009.

(51) Int. Cl.
*G06Q 40/00* (2012.01)

(52) U.S. Cl.
USPC .................................................. 705/4; 705/35

(58) Field of Classification Search
USPC ....................................................... 705/4, 35
See application file for complete search history.

(56) References Cited

U.S. PATENT DOCUMENTS

| | | | |
|---|---|---|---|
| 7,246,070 B2 * | 7/2007 | Schwartz et al. | 705/4 |
| 7,451,097 B1 * | 11/2008 | Faupel et al. | 705/4 |
| 7,685,007 B1 * | 3/2010 | Jacobson | 705/4 |
| 7,774,217 B1 | 8/2010 | Yager et al. | |
| 7,885,830 B2 * | 2/2011 | Johnson et al. | 705/4 |
| 7,890,359 B2 * | 2/2011 | Jacobson | 705/4 |
| 8,046,244 B1 * | 10/2011 | Yager et al. | 705/4 |
| 8,069,067 B2 * | 11/2011 | Schmidlin et al. | 705/4 |
| 8,082,163 B2 * | 12/2011 | Harkensee et al. | 705/4 |
| 8,185,416 B1 * | 5/2012 | Jacobson | 705/4 |
| 8,219,421 B2 * | 7/2012 | Schwartz et al. | 705/4 |
| 8,433,588 B2 * | 4/2013 | Willis et al. | 705/4 |
| 2004/0117217 A1 | 6/2004 | Reber et al. | |
| 2005/0108064 A1 * | 5/2005 | Castleman et al. | 705/4 |
| 2006/0074724 A1 * | 4/2006 | Schwartz et al. | 705/4 |
| 2007/0050217 A1 * | 3/2007 | Holden, Jr. | 705/4 |
| 2007/0100668 A1 | 5/2007 | Webb | |
| 2007/0136109 A1 | 6/2007 | Yager et al. | |
| 2007/0250353 A1 * | 10/2007 | Schwartz et al. | 705/4 |
| 2007/0276704 A1 | 11/2007 | Naumann et al. | |
| 2008/0201177 A1 | 8/2008 | Kennedy et al. | |
| 2009/0030734 A1 | 1/2009 | Peterie | |

(Continued)

*Primary Examiner* — Sara C Hamilton
(74) *Attorney, Agent, or Firm* — Howard IP Law Group, PLC

(57) ABSTRACT

Systems, methods, means and computer program code for administering comprehensive protection plans are provided which include a computer system to process an insurance claim, the system having a first policy database storing policy data associated with a first type of insurance, a second policy database storing policy data associated with a second type of insurance, a requestor device and a claims processing system for receiving an insurance claim associated with a customer, determining that the claim involves a single loss event and more than one type of property damage, retrieving from the first policy database, information associated with a first policy of the customer and at least a second policy of the customer, the information including a first deductible associated with the first policy and a second deductible associated with the second policy, determining which of the first and second deductible to apply to the claim, and updating the first and second policy databases based on the determined deductible.

24 Claims, 6 Drawing Sheets

(56) References Cited

U.S. PATENT DOCUMENTS

| | | |
|---|---|---|
| 2009/0112634 A1* | 4/2009 | Koziol .................... 705/4 |
| 2009/0157433 A1* | 6/2009 | Schmidt et al. ............ 705/4 |
| 2009/0248454 A1* | 10/2009 | Amigo et al. ............. 705/4 |
| 2009/0254380 A1* | 10/2009 | Schmidlin et al. ......... 705/4 |
| 2010/0057499 A1* | 3/2010 | Fennelly .................. 705/4 |
| 2010/0070311 A1* | 3/2010 | Heydon et al. ............ 705/4 |
| 2010/0223072 A1* | 9/2010 | Jacobson ................. 705/3 |
| 2010/0223078 A1* | 9/2010 | Willis et al. ............. 705/4 |
| 2011/0106569 A1* | 5/2011 | Price ..................... 705/4 |
| 2011/0202372 A1* | 8/2011 | Folsom ................... 705/4 |

\* cited by examiner

SYSTEMS AND METHODS FOR ADMINISTERING COMPREHENSIVE PROTECTION PLANS

CROSS-REFERENCE TO RELATED APPLICATION

The present application claims benefit of and priority to U.S. Provisional Patent Application Ser. No. 61/252,887 filed on Oct. 19, 2009 and entitled "System and Method for Administering Comprehensive Protection Plans", the contents of which are incorporated herein by reference for all purposes.

FIELD

Embodiments relate to systems and methods for administering comprehensive protection plans.

BACKGROUND

Insurance companies offer a great number of insurance coverages, policy terms, and options. As a result, it can be difficult for an insurance agent or customer to determine appropriate insurance coverages, limits and deductibles for a particular insurance need. For example, in a typical personal lines automobile policy, an agent or customer must select from among different deductibles, different terms, and different policy add-ons (such as roadside assistance, or the like). Selecting the most appropriate combination of terms and coverages can be difficult. It would be desirable to provide a package or bundle of policy options which make it easier for an agent or customer to select the most desirable policy package.

Many customers have multiple policies. For example, many homeowners have both a homeowner policy as well as one or more automobile policies. Insurers typically underwrite and administer these different types of policies using different systems. Each of the policies typically has different deductible options. However, in many claim or loss situations, a customer suffers a loss that affects several different policies. It would be desirable to provide systems and methods that allow a single deductible to be applied to such a claim. It would further be desirable to provide systems and methods which allow insurers to update different policy systems to reflect the application of such a single deductible to a claim.

DETAILED DESCRIPTION

Applicants have recognized a need for insurers to provide a package or bundle of policy features for insurance policies, such as automobile policies. Pursuant to some embodiments, a bundle or package of policy features are provided which provide improved benefits and advantages to policy holders and policy issuers. Such a comprehensive protection plan, pursuant to some embodiments, includes a number of policy rules and criteria which allow the policy features to be combined and issued as a bundle or package to qualified applicants. Pursuant to some embodiments, the policy rules and criteria also include rules and criteria which allow the issuance of policy features that cross product types. For example, in some embodiments, policies may be issued which provide coverage for situations where an insured suffers a covered loss to more than one kind of property in a single loss event. In such situations, pursuant to some embodiments, only one deductible may apply to the covered loss, even though the loss affects more than one policy or property type. In this manner, embodiments allow more predictable and straightforward issuance of new policies. Further embodiments allow reduced pricing for certain policy holders who carry insurance coverage for multiple property types.

Figure 1:
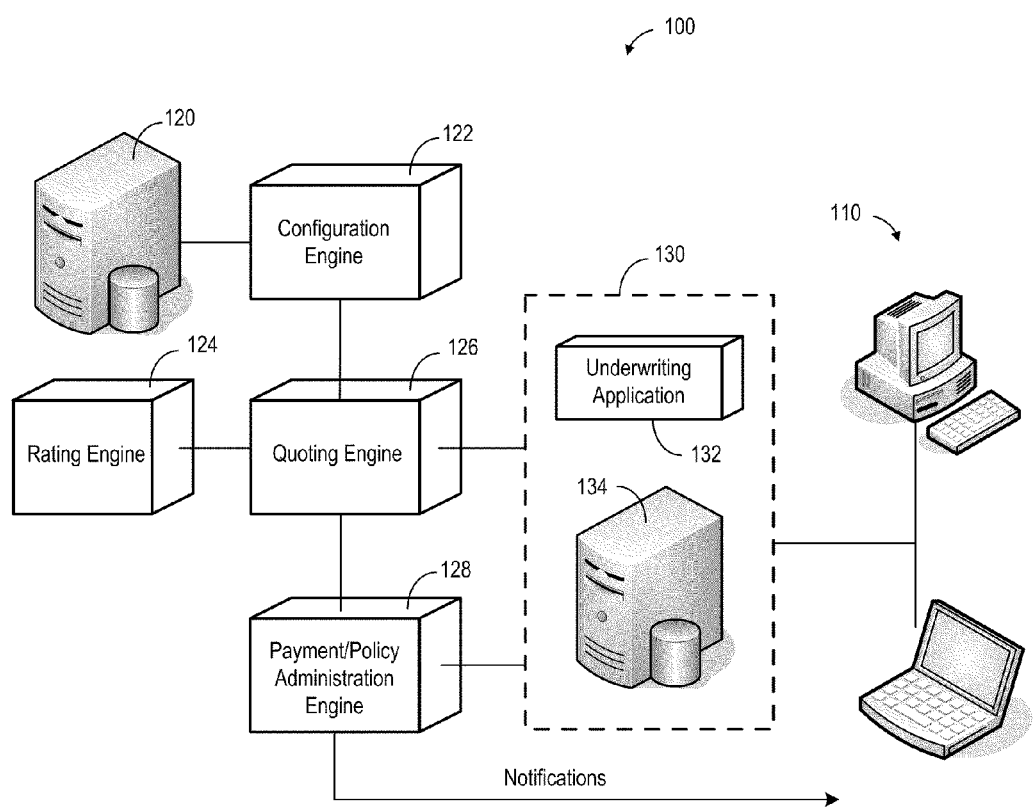
FIG. 1 illustrates a system architecture within which some embodiments relating to policy issuance and decisioning may be implemented.

Features of some embodiments will now be described by first referring to FIG. 1 which illustrates a system architecture 100 within which some embodiments may be implemented. More particularly, FIG. 1 depicts a system architecture 100 in which comprehensive protection plans may be quoted, priced, issued and managed. Although the devices of architecture 100 are depicted as communicating via dedicated connections, it should be understood that all illustrated devices may communicate to one or more other illustrated devices through any number of other public and/or private networks, including but not limited to the Internet. Two or more of the illustrated devices may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

According to the example architecture shown in FIG. 1, a number of requestor terminals 110 are provided which comprise devices that may be operated by an insurance agent, a consumer, etc. seeking a recommendation of insurance coverages or information about policies such as personal lines insurance policies. Requestor terminals 110 may interact with Web pages provided by Web server 134 to request a recommendation and to provide data relating to the kinds of property to be insured, as well as the customer. This data may be transmitted to the insurance systems 130 to determine a recommendation as described in detail below. More particularly, pursuant to some embodiments, the requests and applications may be associated with requests for personal line insurance policies (such as, for example, automobile policies and homeowner policies). The requests may be received from individuals or entities seeking insurance coverage or for requests for insurance information. For example, with respect to applications for automobile insurance, the application data submitted via a requestor terminal 110 may include information identifying the vehicle for which coverage is sought, information about the insured, information about the limits and other options requested, or the like, but embodiments are not limited thereto.

As used herein, an insurance coverage "package" may comprise a set of one or more insurance coverages or policy features. Each of the one or more insurance coverages or features may insure against one or more risks, or provide one or more benefits. In the present description, an insurance coverage defines the parameters of the risk(s) which are covered thereby, and a configuration is a package of one or more insurance coverages, including specified limits and deductibles for each of the one or more insurance coverages.

Any number of requestor terminals 110 may be employed to receive customer and insurance request data and to present insurance coverage and other information to operators of the requestor terminals 110.

The requestor terminals 110 may be in communication with an insurance company 130 or other provider via a Web server 134 or other front end interface that allows remote terminals to send and receive data to the insurance company. The customer and insurance request data are received via the Web server 134 and are stored by data warehouse 120 for later action. Any number or type of data storage systems may store the data in any suitable manner according to some embodiments. Non-exhaustive examples include a relational database system, a spreadsheet, and any other data structure that is amenable to parsing and manipulating data. Data warehouse 120 may receive and store customer and application data as well as store insurance coverage package data and rules which are used in the quoting engine 126 and the configuration engine 122.

The configuration engine 122 acts to receive the customer or insurance request data and to retrieve insurance coverage package data and rules from the data warehouse 120. Configuration engine 122 may identify one or more insurance coverage packages based on the received data and on data received from Web server 134. Pursuant to some embodiments, different insurance packages are assembled for presentation to the customer based on configuration rules and information associated with each policy term.

Figure 6:
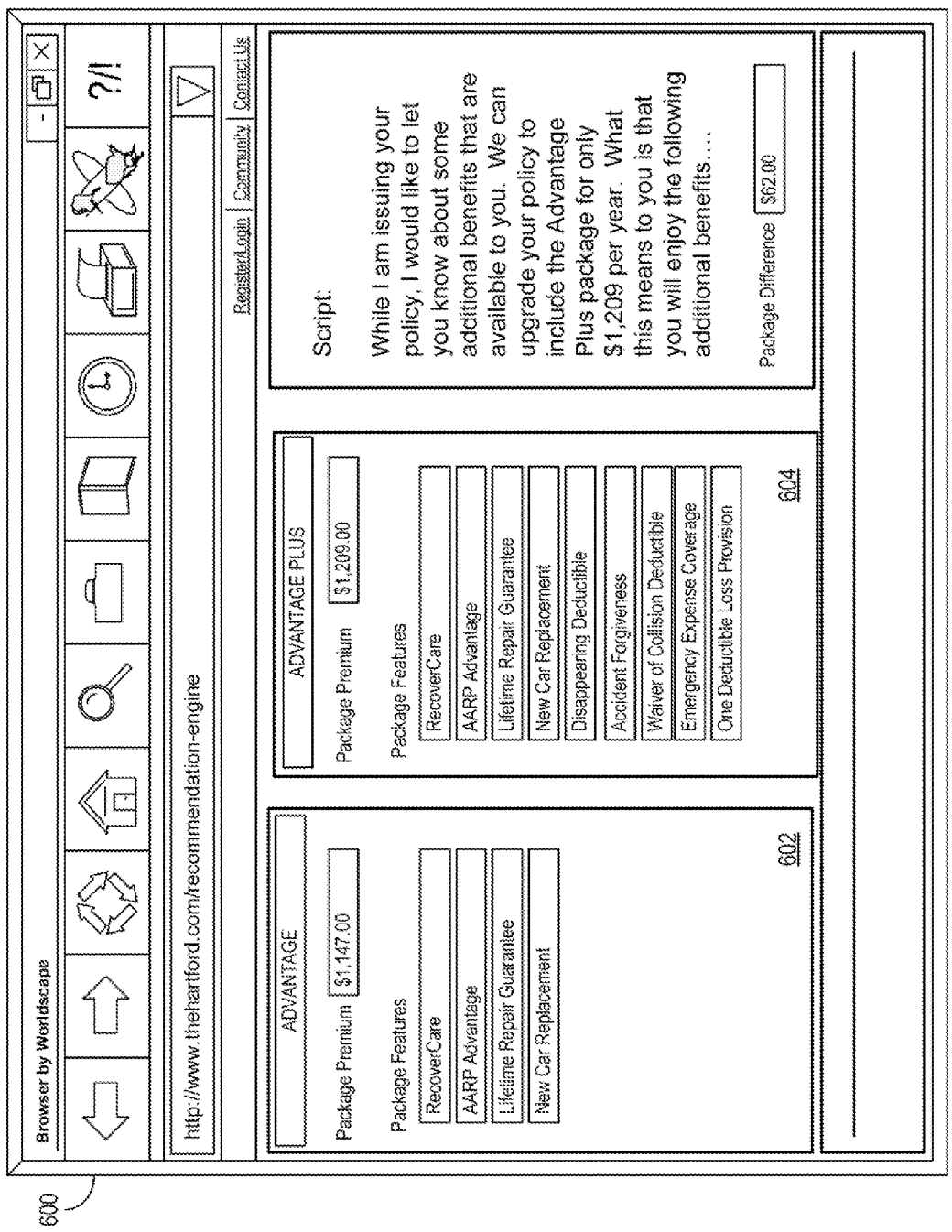
FIG. 6 is a outward view of an interface to present comprehensive protection plan options according to some embodiments.

When an appropriate package (or packages) is identified by the configuration engine 122, the package may be priced using the quoting engine 126 and then presented to the customer or agent via a Web page or other user interface for viewing on a display screen of a requestor terminal 110. An illustrative example of a user interface 600 that may be displayed on a screen of a requestor terminal 110 is shown at FIG. 6. As shown, the user interface 600 displays several packages of features that are compatible and appropriate for a customer. In particular, the user interface 600 includes two packages that have been identified (e.g., by the system 100) as being available to a consumer seeking automobile insurance. The package identified as item 602 has a number of policy features which are compatible and which result in an overall premium of a first amount, and the package identified as item 604 has a number of policy features which are compatible and which result in an overall premium of a second amount. In the user interface shown, a script is dynamically generated for the agent to explain the differences between the two packages.

One difference is the pricing difference between the two packages. In this manner, agents and other representatives (and even customers themselves) may easily create packages of policy features that have desirable benefits to customers. Those skilled in the art will appreciate that a wide variety and type of user interfaces may be provided, and that the user interface 600 is provided for illustrative purposes only.

Referring again to the system of FIG. 1, each of the engines 122, 124, 126, 128 and the insurance systems 130 may comprise any combination of hardware and/or processor-executable instructions stored on a tangible medium. According to some embodiments, one or more of the engines 122, 124, 126 or 128 may be a component of the data warehouse 120 or the insurance systems 130.

It should be noted that embodiments are not limited to the devices illustrated in FIG. 1. Each device may include any number of disparate hardware and/or software elements, some of which may be located remotely from one another. Functions attributed to one device may be performed by one or more other devices in some embodiments. The devices of system 100 may communicate with one another (and with other non-illustrated elements) over any suitable communication media and protocols that are or become known.

Figure 2:
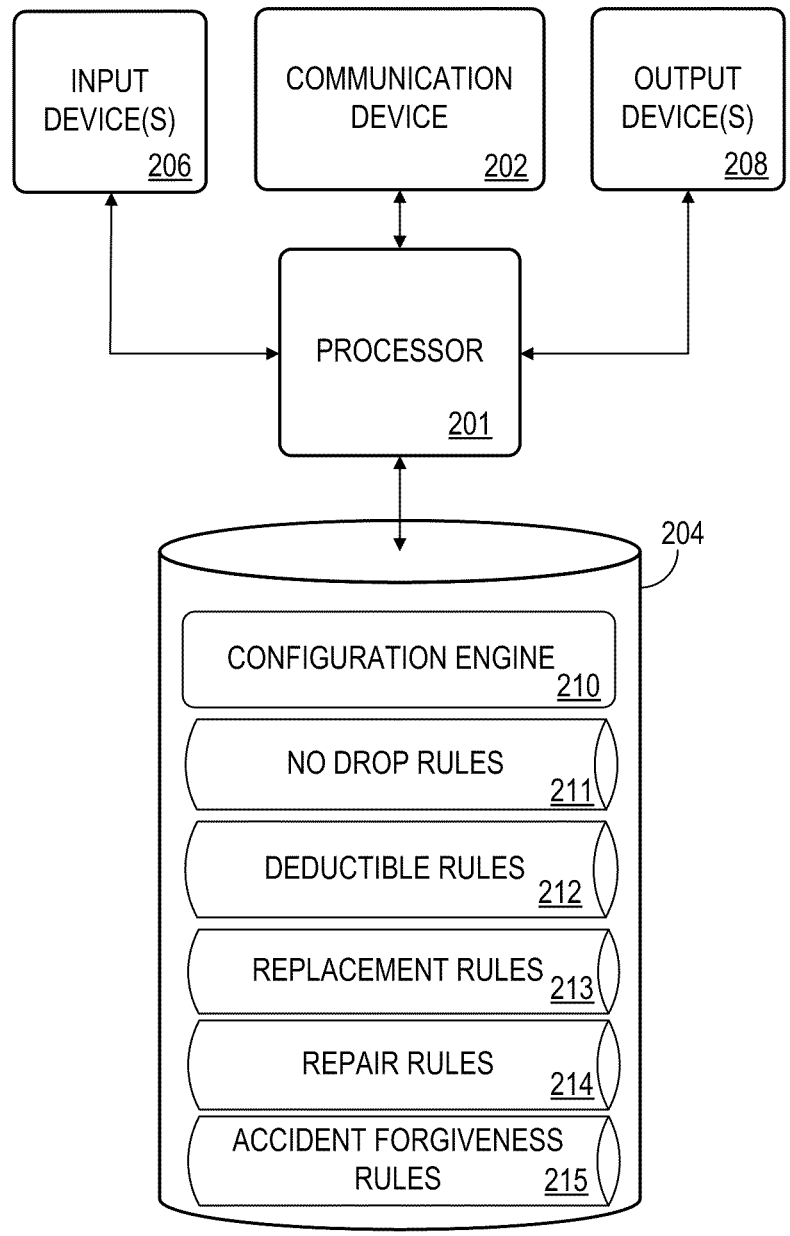
FIG. 2 is a partial functional block diagram of a computer system provided in accordance with some embodiments.

FIG. 2 is a block diagram of a computer system 200 according to some embodiments. Computer system 200 may perform the functions attributed above to the configuration engine 122. Computer system 200 includes computer processor 201 operatively coupled to communication device 202, data storage device 204, one or more input devices 206 and one or more output devices 208. Communication device 202 may facilitate communication with external devices. Input device(s) 206 may comprise, for example, a keyboard, a keypad, a mouse or other pointing device, a microphone, knob or a switch, an infra-red (IR) port, a docking station, and/or a touch screen. Input device(s) 206 may be used, for example, to enter information into computer system 200. Output device(s) 208 may comprise, for example, a display (e.g., a display screen) a speaker, and/or a printer.

Data storage device 204 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Data storage device 204 stores program instructions for execution by processor 200. Configuration engine 210 may comprise a set of such instructions, and may be executed by processor 201 to cause system 200 to operate as described above with respect to configuration engine 122 of FIG. 1. This operation may initially include operation of communication device 202 to retrieve, from external data storage device 220, policy rules and criteria including, for example, no drop rules 211, deductible rules 212, replacement rules 213, repair rules 214, or accident forgiveness rules 215 (in the case of a configuration engine used for underwriting personal lines automobile policies, for example). In some embodiments, and as described with respect to FIG. 1, data storage device 220 may comprise a data warehouse.

Data storage device 204 may store other data used and/or generated during operation according to some embodiments. For example, the data storage device 204 may store data including configuration rules, homeowner policy rules, or the like. The nature and usage of this stored data according to some embodiments will be described in detail below.

Each of the rules stored in the system 200 may include data defining a policy feature, as well as data identifying the availability of the policy feature in combination with one or more other policy features into a package of features. For example, the following individual policy features may be provided, some of which may be combined into one or more packages of features. In some embodiments, rules associated with a "no-drop promise" feature may be specified as rules 211. Pursuant to some embodiments, this policy feature may be added to auto insurance policies issued using the present invention and may be combined with certain other policy features to create a package. The policy feature may include terms indicating that, regardless of the number of traffic convictions or accidents an insured or a listed operator has during the policy period, the policy will be renewed. Some exceptions may include situations where the insured (or a covered operator) is convicted of driving under the influence or impaired, has a suspended or revoked license, or is physically or mentally incapable of operating a vehicle.

A further example of a policy feature is a "RecoverCare" feature. Pursuant to some embodiments, this policy feature may be added to auto insurance policies issued under the present invention and, in some situations, may be combined with other policy features to create a package. The RecoverCare feature may provide insured consumers with reimbursement for home services in the event the insured is injured in an accident. In some embodiments, the insured may receive reimbursements of a predetermined amount (e.g., up to $2,500 over six months, in one embodiment) for home services including house cleaning, shopping, lawn care, dog walking or the like. In some embodiments, the policy feature may include terms specifying the type of services that are reimbursable, the amount, the term, and any preferred vendors. In some embodiments, certain services may receive preferential treatment such as "green" discounts in the event a service provider uses "green" (or environmentally-friendly) products.

A further example of a policy feature is a "Lifetime Repair Guarantee" feature (e.g., such as item 214 of FIG. 2). Pursuant to some embodiments, this policy feature may be added to auto insurance policies issued under the present invention and, in some situations, may be combined with other policy features to create a package. In some embodiments, the policy feature provides a lifetime guarantee for all repair services conducted under the policy so long as an approved vendor is used to perform the repair services.

A further example of a policy feature is a "Roadside Assistance" feature. Pursuant to some embodiments, this policy feature may be added to auto insurance policies issued under the present invention and, in some situations, may be combined with other policy features to create a package. The policy feature may terms specifying the nature of roadside assistance benefits to be provided under the policy.

A further example of a policy feature is a "New Car Replacement Guarantee" feature (such as item 213 of FIG. 2). Pursuant to some embodiments, this policy feature may be added to auto insurance policies issued under the present invention, and may provide an insured with a replacement guarantee for new vehicles for a specified period of time and/or for a specified amount of usage. In some embodiments, the feature may be combined with other compatible features to create a package. For example, the policy feature may include the following terms: a definition of what a "new auto" is (e.g., such as a vehicle purchased by the insured with less than 150 miles on it), a specified period of time (such as 15 months from the purchase of a new car), and/or a specified amount of usage (such as 15,000 miles), a qualifying event (e.g., such as a "total loss" or theft), and a benefit (e.g., such as the lesser of the replacement cost of the vehicle and the amount necessary to replace the new auto).

A further example of a policy feature is a "12-Month Policy" feature. Pursuant to some embodiments, this policy feature may be added to auto insurance policies issued under the present invention and, in some situations, may be combined with other policy features to create a package. The policy feature may include terms which lock in the insured's rates for an entire year.

A further example of a policy feature is a "First Accident Forgiveness" feature. Pursuant to some embodiments, this policy feature may be added to auto insurance policies issued under the present invention and, in some circumstances, may be combined with other compatible features to create a package. The policy feature may include terms specifying that the insured (or an authorized operator) will have any premium increase (that would have been assessed based on an accident) waived if certain conditions are met. For example, the waiver may apply if, at the time of the accident, the operator was free from at-fault accidents (e.g., the insured was at least 50% responsible) and major traffic violations, for at least five years prior the effective date of the policy.

A still further example of a policy feature is a "Disappearing Deductible" feature. Pursuant to some embodiments, this policy feature may be added to auto insurance policies issued under the present invention and, in some circumstances, may be combined with other features to create a package. The policy feature may include terms which reduce the insured's deductibles until the deductible goes to $0 in some situations. Further, in some embodiments, the deductible for some not-at-fault accidents may be eliminated. Further still, in some embodiments, an insured's deductible may be reduced by an amount (such as $100) if the insured uses an approved repair shop for any repairs.

In some embodiments, policy holders who have both auto and home insurance policies may enjoy disappearing or reduced deductibles based on the combined policies. For example, in some embodiments, a combined policy may include deductible reduction features where the policy holder may receive a deductible reduction on his or her auto policy based on activity on the home policy (or vice versa). In some embodiments, payment of a deductible amount on one of the policies (e.g., such as the homeowners policy) may result in a waiver of all or a portion of the deductible (in a given policy year, for example) on the other policy (e.g., such as the auto policy). Such interaction between different policies (e.g., an automobile policy and a homeowner's policy) will be described further below.

A still further example of a policy feature is a "Green" feature. Pursuant to some embodiments, a "Green" feature may be added to auto insurance policies issued under the present invention and, in some situations, may be combined with other features to create a package. The policy feature may include terms which encourage the use of environmentally friendly resources and vendors. The terms of such a policy may specify discounts, premium credits, or lowered deductibles for the use or purchase of: a hybrid vehicle, a vehicle with desirable fuel efficiency, a vehicle used for commuting (where the policy holder agrees to use alternative forms of transportation a specified amount of time, such as public transportation, walking, carpooling, or cycling). Policy terms may also specify preferred vendor rates or reimbursements for using vendors deemed "green" (e.g., for the use of reimbursable services from a "green" house cleaner, or "green" vendors). In some embodiments, additional discounts, premium credits or lowered deductibles may be offered for consumers who agree to go "paperless" (e.g., by receiving policies or notifications electronically, or by remitting premium payments using electronic fund transfer).

In some embodiments, the various policy features may be packaged into one or more plans. For example, one plan may include the following features: No-Drop Promise, RecoverCare, Lifetime Repair Guarantee, Roadside Assistance, and New Car Replacement Guarantee. Another plan (e.g., having a higher premium or different underwriting criteria), may include the same features as the first plan and also the 12-month Policy, First Accident Forgiveness, Disappearing Deductible, and the Green Feature Other combinations and packages of features may also be provided. Further, other features (not specifically described herein) may be provided along with corresponding rules and criteria for their combination.

Pursuant to some embodiments, each of the individual features may be identified by a feature identifier and each feature identifier associated with a set of rules defining one or more packages the feature is compatible with. In some embodiments, each feature identifier is associated with one or more rules defining which other features the feature may be combined with. In some embodiments, each feature identifier is further associated with one or more pricing rules, allowing the quoting engine (such as item 126 of FIG. 1) to construct an overall quote based on a selected combination of features.

By applying one or more rules and configuration criteria, the configuration engine may respond to requests for insurance with policy packages having desirable pricing and feature sets. The policies may be accepted by a customer and issued by the insurance company as normal. Once a policy has been issued, embodiments provide systems and methods for claim processing. More particularly, embodiments allow claims to be processed which involve more than one kind of property in a single loss event. The processing of such claims will now be described by first referring to FIG. 3 which illustrates a claim processing architecture 300 within which some embodiments may be implemented.

Figure 3:
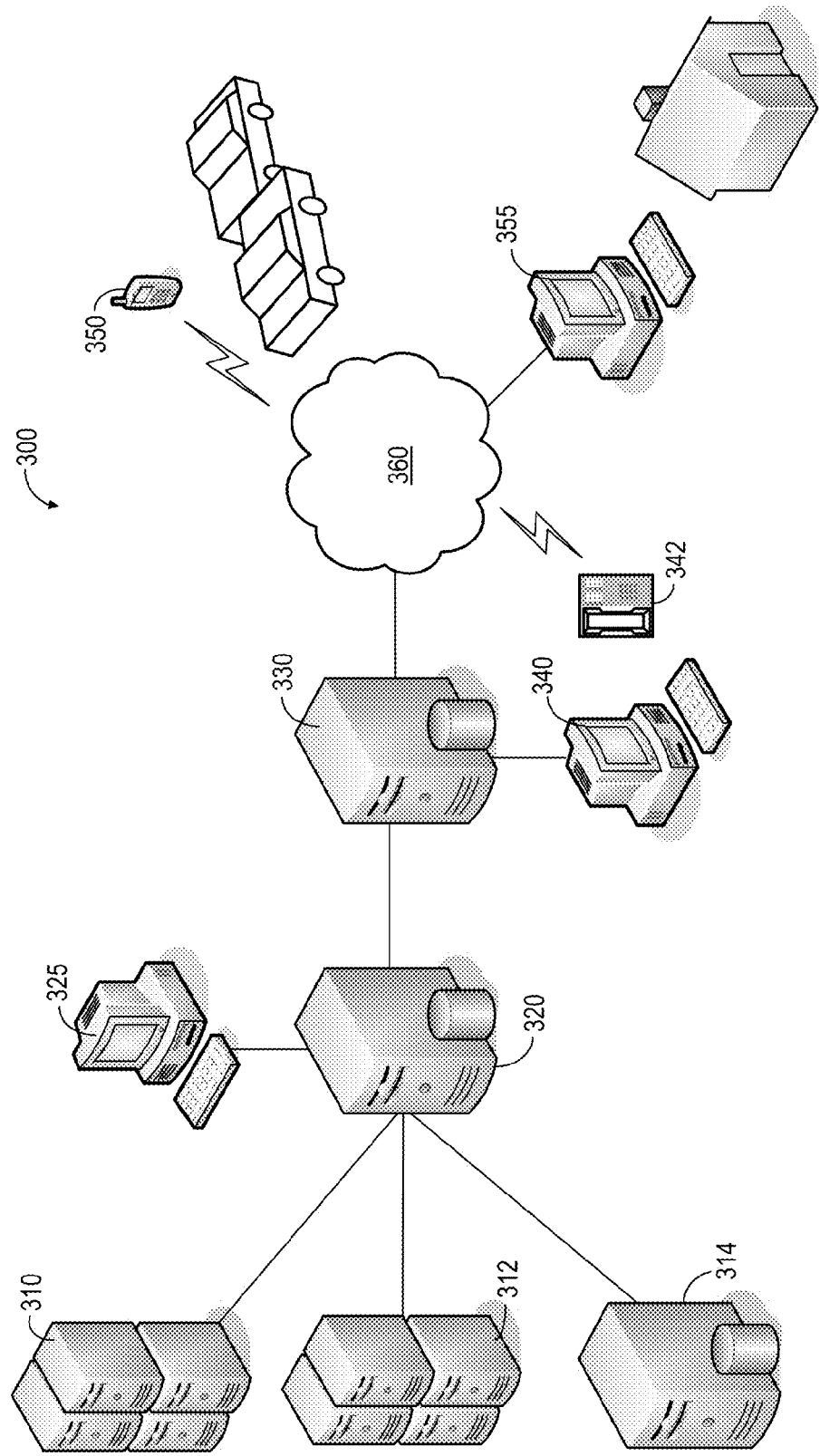
FIG. 3 is a system architecture within which some embodiments relating to claim processing may be implemented.

In particular, in the claim processing architecture 300 of FIG. 3, an insured who has both a homeowner's policy and an automobile policy and who has suffered a loss involving property covered by each of those policies, is able to submit a claim which results in a single deductible being applied to the loss. In prior systems, the insured would have had to pay a deductible amount associated with the automobile policy as well as a deductible associated with the homeowner's policy (even if a single event caused the loss to property covered by the two policies). Further, pursuant to embodiments of the present invention, even if the two (or more) policies are managed or administered by separate systems, the crediting of a single deductible across the policies will be reflected in each of the relevant systems.

Although some devices of architecture 300 are depicted as communicating via dedicated connections, it should be understood that all illustrated devices may communicate to one or more other illustrated devices through any number of other public and/or private networks, including but not limited to the Internet. Two or more of the illustrated devices may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

According to the example of FIG. 3, policy sources 310 through 314 store policy information associated with insurance policies. Policy information may include any combination of policy-related data fields that are or become known, including but not limited to policy type, policy number, insured name, deductibles, coverage limits, riders and exceptions. Each of policy sources 310 through 314 may comprise any combination of hardware and/or software, including but not limited to relational databases, application servers, and spreadsheets. One or more of policy sources 310 through 314 may comprise a policy issuing system, a data warehouse of an insurance company or any other aggregator of insurance policy information.

Pursuant to some embodiments, policy source 310 is a source of personal lines automobile policies which have been issued by an insurer, and policy source 312 is a source of homeowner policies. As homeowner policies and automobile policies are typically maintained by separate business groups of an insurer, different policy sources and systems (such as sources 310-314) may be maintained on separate platforms or database systems.

Each of policy sources 310 through 314 may provide policy information to system 320 asynchronously or according to any schedule. In some embodiments, one or more of policy sources 310 through 314 provides a daily feed of policy information to system 320. The policy information of the feed may be associated with new insurance policies for which an initial premium has been paid.

System 320 may comprise any combination of hardware and software to perform processes as described herein. According to some embodiments, when an insured party submits a claim or request for information about a policy, system 320 receives policy information associated with an insurance policy from one of sources 310 through 314 and processes the claim or other request. In the event that an insured party submits a claim involving a policy issued pursuant to some embodiments, a process such as the process described below in conjunction with FIG. 4 may be performed. In general, however, when a request is received involving a policy stored in one of the policy sources 310 through 314, the data is retrieved and returned to system 320 for processing.

System 320, as well as claims management system 330 may comprise program instructions of a database management system, database procedures and/or database applications to process the data stored at those systems or retrieved by those systems. One or more administrator terminals 325 may be operated to edit this data and to otherwise provide commands to system 320. For example, an administrator terminal 325 may be operated to update a data structure including information associated with a claim or the like. Terminal 325 may comprise any suitable device, including but not limited to a desktop computer.

Claim management system 330 may receive policy records and associated claim handling identifiers from system 320. For example, portions of several illustrative policy records that may be processed by claims management system 330 are shown below in conjunction with FIG. 5. Claim management system 330 may receive a report of a claim associated with an insurance policy and determine the claim handling identifier of the record associated with the insurance policy. A customer service representative may use the claim handling identifier to assign the claim to the appropriate claim-handling organization. In this regard, customer service representatives may operate terminals 340 and 344 to access the records of claim management system 330. All terminals described herein may comprise any suitable devices for requesting and displaying user interfaces, including but not limited to desktop computers, cellular telephones, personal digital assistants, and laptops.

According to some examples, an insured individual suffers a loss which involves property damage to both an automobile and a home (or multiple automobiles and/or homes) and submits a claim to an insurance processing system 330 over a network interface (for example, the claim may be submitted using a phone 350 or a computer terminal 355).

Whether the claim is submitted via a phone 350 or a computer terminal 355, the claim request is routed to a telephone 342 associated with a customer service representative. For example, the insured individual (who suffered automobile and property losses) may operate a telephone 350 to call a claim-reporting telephone number provided by an insurance company. The call is passed through a network 360 (e.g., the Public Switched Telephone Network, a cellular network, and/or an Internet Protocol network) and terminates at telephone 342 of a customer service representative. Embodiments may also or alternatively provide claim reporting via one or more other communication modes, such as facsimile, electronic mail, or World Wide Web.

The customer service representative receives an identifier of the insured's policy (e.g., policy number, social security number, etc.) and operates a client application executed by terminal 340 to retrieve a record of claim management system 330 associated with the policy. The customer service representative determines a claim handling identifier of the record and assigns the claim based thereon. Depending on the nature of the claim handling identifier, assignment of the claim may include providing a telephone number of a third-party administrator to the insured or transferring the telephone call to a claim-handling organization of the insurance company. A process is then performed by the claim management system 330 to determine if the claim relates to a single deductible loss provision of the present invention and, if so, how the deductible should be determined and applied. The process is described below in conjunction with FIG. 4.

The insurance system 300 of FIG. 3 may provide other administration and maintenance features associated with policies issued pursuant to the present invention. For example, a system server 320 may operate to receive and process policy change or update requests and may generate an interface or display screens to allow faster and easier policy service. Agents and insureds may interact with the system 320 to manage customers policy changes in real-time by performing actions such as: (i) add, replace, delete or change vehicles, drivers, and coverages; (ii) quote "what if" scenarios and save them for later, (iii) provide an immediate or substantially real time confirmation on a wide variety of policy changes, (iv) view a billing breakdown, print ID cards and forms, etc.

Server 320 may also include a vendor interface to control communications between third party vendor systems and claim data associated with claims processed using claims processing system 320. For example, a vendor interface may facilitate communication to secure vendor services for a customer who has initiated a claim. As a specific illustrative example, for a customer who has initiated a claim for total loss under an automobile policy claim, and who has the New Car Replacement Guarantee policy feature in force, a vendor interface may provide the customer with a list of preferred auto dealers in the customer's area (and similarly, may transmit a notification to one or more dealers of the customer's need for a new vehicle).

As another illustrative example, a vendor interface of server 320 may initiate a request, and secure an appointment, for an appraiser to inspect and appraise the damage to the customer's vehicle. In this manner, by allowing direct interaction with third party vendor systems, server 320 may efficiently control all aspects of a claim process, ensuring that customers enjoy a greater quality of service, reduced delays, and improved communication.

In some embodiments, server 320 may also include a notification module or code administering and applying notification and messaging rules associated with individual policies and policy features pursuant to the present invention. For example, the notification code may operate to generate one or more notifications to insured customers or vendors. As a specific example, all active policies stored in policy stores 310-314 may be monitored to identify any upcoming "trigger" events or dates, such as the expiration or activation of a benefit (such as the activation of an "expired deductible" benefit, or the expiration of a new car guarantee, etc.).

A number of notifications may be generated using the notifications code of server 320. These notifications may vary depending on the policy feature included in a policy or based on the package of policy features in a policy. For example, for insureds having the Disappearing Deductible and Combined Deductible features, an automated email or letter may be generated notifying the policyholder that their deductible has been lowered by $100 or disappeared as the requisite periods pass, e.g. six month, 1 year, etc. As another example, for insureds having the RecoverCare policy feature, automated notifications/reminders via email or otherwise of existence of the coverage itself may be generated. As another example, for insureds having the New Car Replacement guarantee, automated notifications may be generated and transmitted to new car dealer in policyholder's zip code to contact policyholder and/or tie-in to online car buyer's site provide recommendations of similar cars if necessary and other tie ins to dealer inventories to match car color and features from in stock inventory.

As discussed above, the vendor interface code provides communication with third party vendors. In some embodiments, the vendor interface code provides a data feed integration for vendors related to the Lifetime Repair, and Disappearing Deductible since policyholder's enjoy a lower deductible if the policyholder chooses an approved vendor which then implicates the Lifetime Repair guarantee thus a data tie in between approved vendor, insurance co and policyholder.

In some embodiments, policyholders may be provided with one or more options to change features for other benefits, e.g. instead of getting the benefits of the Disappearing Deductible and Combined Home/Auto Deductible, an additional benefit amount may be added to (for example), the RecoverCare policy feature (e.g., increasing the amount from $2,500 to $3,000, or the like).

It should be noted that embodiments are not limited to the devices illustrated in FIG. 3. Each device may include any number of disparate hardware and/or software elements, some of which may be located remotely from one another. Functions attributed to one device may be performed by one or more other devices in some embodiments. The devices of system 300 may communicate with one another (and with other non-illustrated elements) over any suitable communication media and protocols that are or become known.

Figure 4:
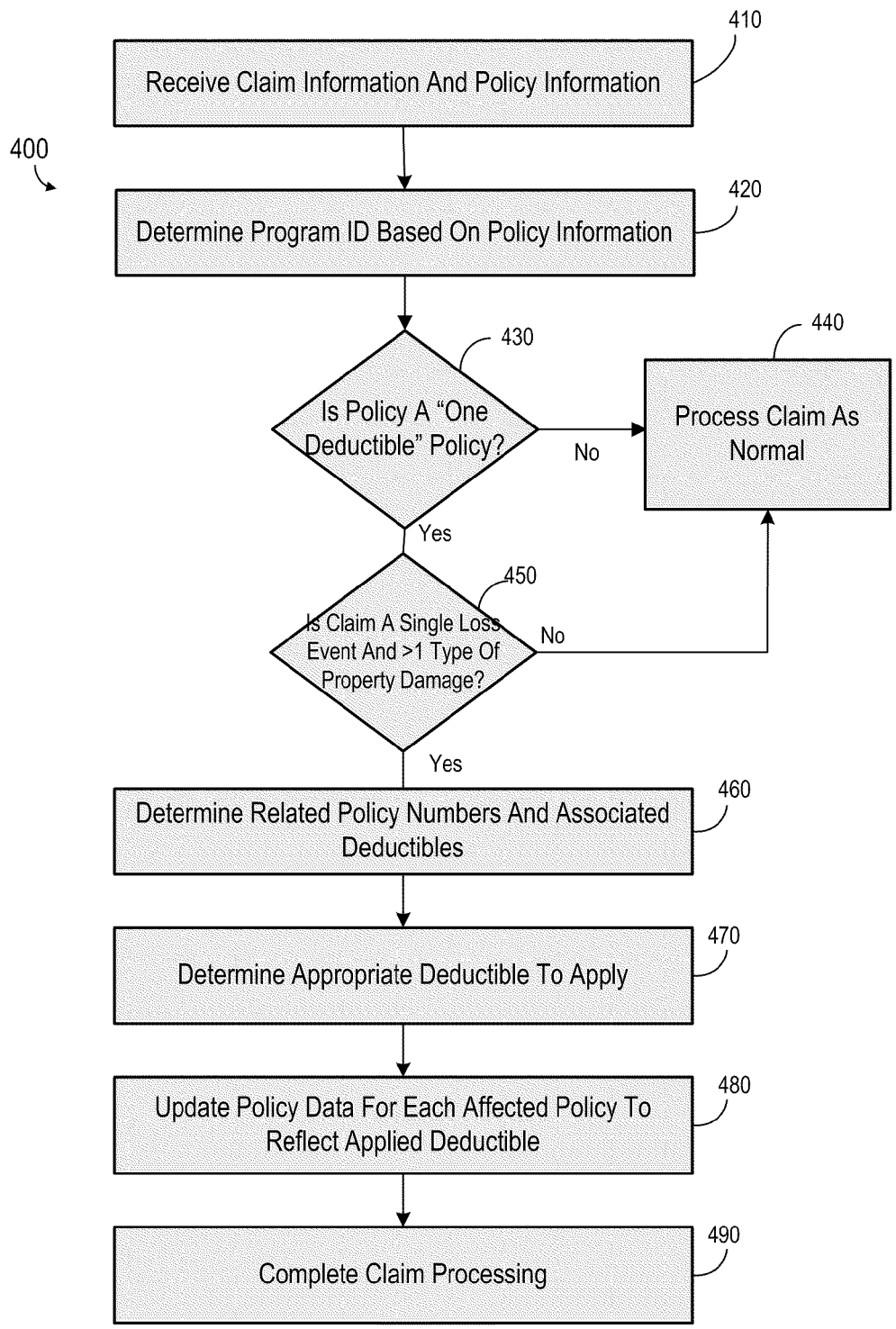
FIG. 4 is a flow diagram of a process according to some embodiments.

FIG. 4 is a flow diagram of process 400 according to some embodiments. Various elements of system architecture 300 may execute process 400 according to some embodiments. Process 400 may be embodied within program instructions of claim management system 330, but embodiments are not limited thereto.

Process 400 and all other processes mentioned herein may be embodied in processor-executable program instructions read from one or more computer-readable media, such as a floppy disk, a CD-ROM, a DVD-ROM, a Zip™ disk, and a magnetic tape, and then stored in a compressed, uncompiled and/or encrypted format. In some embodiments, hard-wired circuitry may be used in place of, or in combination with, program instructions for implementation of processes according to some embodiments. Embodiments are therefore not limited to any specific combination of hardware and software.

Process 400 may be performed in response to a claim or loss notification submitted by an insured individual (e.g., using the system of FIG. 3). More particularly, the process 400 is performed when a claim or loss notification is submitted for a policy issued pursuant to embodiments of the present invention. The process, as will be described, allows an insured individual to enjoy the benefits of a single deductible across different policies and property types in the event of a single loss event damaging properties covered under different policies. Further, the process allows an insurance company to efficiently and accurately track such transactions so that policy data from different policy systems may be updated to appropriately record the claims.

Processing begins at 410 where an insurance system (such as the system 300 of FIG. 3, and more particularly, the claims processing system 330 of FIG. 3) receives claim information and policy information. For example, the claim and policy information may include data submitted or otherwise provided by an insured (e.g., via a phone 350 or computer 355) to an agent or other representative (e.g., operating a phone 342 or computer 340). The claim information received may include information identifying the loss event and the property affected by the loss. The claim information may also include information about the severity of the loss and any related property loss resulting from the event. The policy information may include information such as a policy identifier or account number.

Processing continues at 420 where the insurance system determines the program ID based on the policy information received at 410. For example, in some embodiments, each policy may have an identifier associated with it that identifies a particular package of policy benefits. One of the policy benefits may be a "one deductible loss" provision which allows a single deductible to be applied in the event of certain single loss events. The program ID retrieved or identified at 420 may be used to identify policies having such a one deductible loss provision, although those skilled in the art will appreciate that other techniques may be used to identify the eligibility of policies for such a provision.

Processing continues at 430 where a determination is made of whether the policy is a "one deductible loss" eligible policy (e.g., by comparing the program ID to a list of eligible program IDs). If the determination is that the policy is not "one deductible loss" eligible policy, processing continues at 440 where the claim is processed as normal (e.g., claim processing will proceed without attempting to determine a single deductible to use for the claim). If the determination at 430 is that the policy is a "one deductible loss" eligible policy, processing continues at 450 where a determination is made whether the claim is a single loss event involving more than one type of property damage. This determination may be made, for example, by an agent presenting a series of questions to the insured, by the insured responding to a series of questions in a survey or claim form, or the like. For example, a claim that is presented that is based on fire damage to a home that also damaged the homeowner's automobile may qualify at 450 for further processing. In the example, the single loss event is the fire, and the two kinds of properties are the home and the automobile.

If processing at 450 indicates that there was not a single loss event or the event did not involve more than one type of property damage, processing continues at 440 where the claim is processed as normal (e.g., claim processing will proceed without attempting to determine a single deductible to use for the claim). If processing at 450 indicates that there was a single loss event and the event involved more than one type of property damage, processing continues at 460 where the insurance system (or the claims processing system 330) determines the related policy numbers and related deductibles. This processing may be performed, for example, by retrieving policy records from policy stores 310-314. An example of related policy records are shown below in conjunction with FIG. 5. Related policy numbers may be retrieved by, for example, looking up a common identifier associated with each of the policies issued to a consumer (in FIG. 5, an account ID is shown as the common identifier, but those skilled in the art will appreciate that other identifiers and techniques may be used). When the related policies are identified, processing at 460 include retrieving any deductible related data for each of the policies.

Processing continue at 470 where the insurance system (or the claims processing system 33) operate to determine the appropriate deductible to apply to the claim. A number of different rules and techniques may be used to determine the appropriate deductible in a given situation. For example, as an initial inquiry, a determination may be made whether one single highest deductible is available. That is, the deductible that will be applied is the single highest deductible applicable for any item of covered property loss. When one single highest deductible is not available, then, in some embodiments, the deductible that will apply to the loss may be determined as follows:

First, if more than one kind of property has a deductible equal to the single highest deductible the deductible that will apply is the one with the highest earned "deductible reduction benefit". Second, if more than one kind of property has a deductible equal to the single highest deductible and the earned "deductible reduction benefits" are equal, the deductible that will apply is the one for the item with the largest monetary loss. For example, in the fire loss example introduced above, the loss to the home is likely the largest monetary loss and the homeowner's policy deductible will apply. Finally, if more than one kind of property has a deductible equal to the single highest deductible and no "deductible reduction benefit" is applicable, the deductible that will apply is the one for the item with the largest monetary loss.

Those skilled in the art will understand, upon reading this disclosure, that other techniques and rules may be used to identify which deductible to apply when several items of property are involved, each having different deductibles.

Once the appropriate deductible to apply has been determined, processing continues at 480 where the policy data for each affected policy is updated to reflect the applied deductible. In some embodiments, processing at 480 may require updating several different systems (e.g., where policy data for different property types, such as home and auto are stored and maintained in different policy stores 310-314) to indicate the application of the deductible. For example, in the situation where the deductible selected is one from the homeowner policy, processing at 480 may include setting a deductible credit flag or indicator in the associated automobile policy. In this manner, the insurance systems may accurately track the application of deductibles across different policies pursuant to the present invention.

Processing continues at 490 where the claim processing procedures are completed as normal. The result is a system which allows the application of a one deductible loss provision to insurance policies even in the situation where multiple policies stored in different policy stores are affected. Consumers enjoy the benefit of a single deductible in situations where a loss event impacts multiple property types, and insurers enjoy accurate records and consistency in claims processing.

Figure 5:
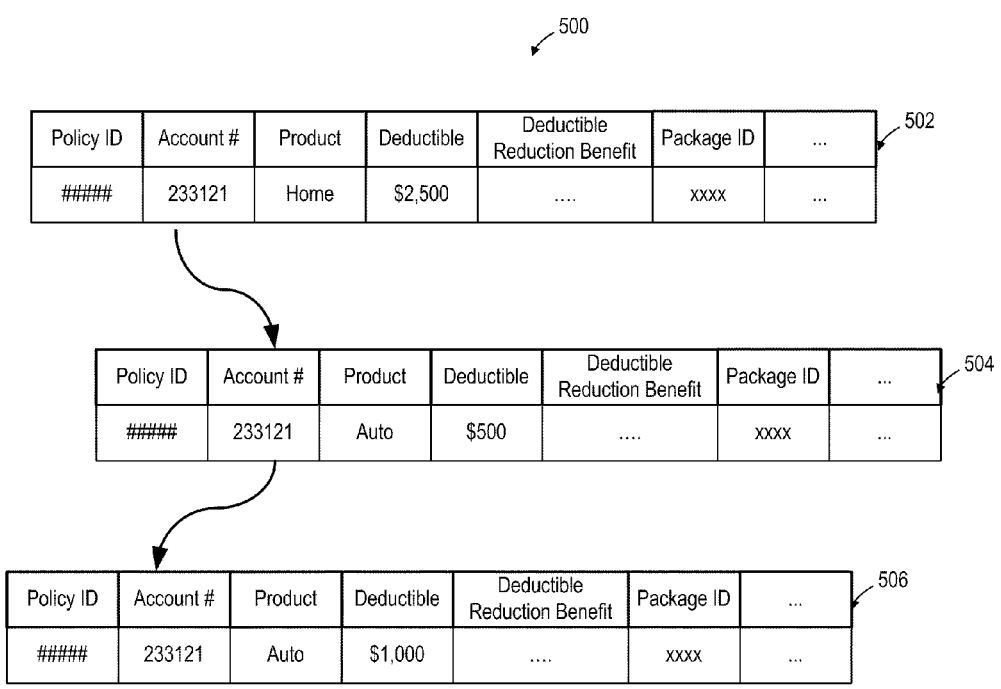
FIG. 5 is a tabular representation of a portion of a data record according to some embodiments.

Reference is now made to FIG. 5 which is a tabular representation of a portion of several policy records 502, 504, and 506 from several different policy data sources (such as policy sources 310, 312, and 314). Each of the policy records 502-506 may be associated with previously issued insurance policies for which a claim or claim request is being made (e.g., such as by a customer operating a telephone 350 or a computer 355 to report a loss). Each of the policy records 502-506 include a number of data fields representing data associated with a particular policy. Only several fields are shown for each policy record for convenience and ease of exposition—those skilled in the art will appreciate that a typical policy record may have more fields and data elements.

Some or all of the data populating each policy record 502-506 may be obtained or generated during an insurance policy issuance process (such as by the system 100 of FIG. 1) or during a policy renewal process. For example, when a customer applies for, and is issued, a new homeowner's policy, the system 100 assigns a policy ID and an account number to track the policy and to associate the policy with a customer account. The system 100 also stores information associated with the terms of each policy. For example, policy record 502 shows a portion of the data associated with a homeowners' policy issued to the customer having account number "233121". The policy has a deductible of $2,500 and the policy is associated with a package of benefits having an identifier of "xxxx". The policy record 502 also stores a number of data elements not shown, such as other deductible limitations and amounts, exclusions of coverage, a specific identification of property covered, and the like.

The other policy records 504-506, as shown, relate to automobile policies issued to the same customer. Each of the automobile policies have different deductible amounts, but all are issued pursuant to the same package of benefits. The three policy records may be linked to each other or identified as related in a number of ways, however, as shown, the three policy records are shown as related based on the account identifier. Embodiments are not limited to the fields shown in FIG. 5, and each data field need not be populated in some embodiments.

Embodiments of the foregoing may therefore provide efficient recommendation of appropriate insurance coverage packages for a given consumer. Further, certain packages may provide a one deductible loss provision that provides a single deductible in the event of a single loss event impacting more than one kind of property.

As previously discussed, each of the rules stored in a system of the present invention may include data defining a policy feature, as well as data identifying the availability of the policy feature in combination with one or more other policy features into a package of features. For example, the following individual policy features may be provided, some of which may be combined into one or more packages of features. In some embodiments, rules may be implemented associated with a "100% Protection Plan" where the insurer will pay the full cost to rebuild a home even if it costs up to 150% of the applicable limits of the policy. Another feature may include a "New For Old" protection of possessions where the insurer will pay the actual cost of replacing possessions regardless of age or condition with brand new items of equal quality. Another feature may include a "ProtectorPLUS Homeowners Deductible Forgiveness" where if a policy holders experiences a qualifying loss of $20,000 or more, the insurer waives up to a certain amount such as $5,000 of the applicable homeowners insurance deductible. Another feature that may be implemented includes a 24/7 Homeowners Insurance Claim Hotline to provide insureds with homeowners insurance claim professionals available any time of the day or night to assist with inquiries, claims or questions. Insureds or prospective insureds may also be given options to customize their homeowners insurance protection through special protection packages such as through increased coverage for jewelry, silverware, credit cards, personal liability, lock replacement, identity theft and loss of perishable food.

The embodiments described herein are solely for the purpose of illustration. Those in the art will recognize that other embodiments may be practiced with modifications and alterations limited only by the claims.

What is claimed is:

1. A computer system for processing data relating to one or more insurance policies, the system comprising:
   a data storage device configured to:
      receive, store and provide access to insurance coverage data, wherein the insurance coverage data includes, for each of a plurality of individual policy features, a corresponding feature identifier and a set of rules defining a compatibility of each of the plurality of individual policy features to one or more other individual policy features;
   one or more memories configured to: store program instructions;
   one or more computer processors coupled to the data storage device and the one or more memories, wherein said one or more computer processors, upon execution of the program instructions, are configured to:
      retrieve the insurance coverage data from the data storage device;
      receive a policy request from an individual, and identify at least two individual policy features from among the plurality of individual policy features based on (i) said policy request from said individual and (ii) a determination of the compatibility of said at least two individual policy features in the insurance coverage data based on said set of rules, wherein at least one of the individual policy features comprises a single deductible feature;
      assemble, responsive to said policy request and based on said set of rules, one or more insurance coverage packages including said at least two individual policy features; and
      generate, based on the at least two individual policy features, pricing information for each of the one or more insurance coverage packages;
   a communication device, coupled to the one or more computer processors, configured to:
      present the generated one or more insurance coverage packages; and
      receive a selection of a selected one of the one or more insurance coverage packages; and
   a policy record data storage device coupled to the one or more computer processors and configured to:
      store a policy record associated with the selected insurance coverage package, wherein the selected insurance coverage package is a first insurance policy and wherein the selected insurance coverage package has an associated first deductible; and
      associate the policy record associated with the selected insurance coverage package with a policy record associated with a second insurance policy, wherein the second insurance policy has an associated second deductible;
   wherein the selected insurance coverage package and the second insurance policy are for different property types;
   wherein said one or more computer processors, upon execution of the program instructions, are further configured to:
      responsive to receipt of an insurance claim involving a single loss event that results in property damage to the property type covered by the selected insurance coverage package and in property damage to the property type covered by the second insurance policy, determine a single deductible for the single deductible feature to apply based upon the first deductible and the second deductible; and update the policy records associated with each of the selected insurance coverage package and the second insurance policy based on said determined single deductible.

2. A computer system according to claim 1, wherein each feature identifier is associated with one or more pricing rules, and wherein generating pricing information for each of the one or more insurance coverage packages is further based on said one or more pricing rules associated with the at least two individual policy features identified in the policy request.

3. A computer system according to claim 1, wherein the one or more computer processors, upon execution of the program instructions, are further configured, subsequent to receipt by the communication device of the selection of the selected one of the one or more insurance coverage packages to:

determine an alternative one of the one or more insurance coverage packages; and wherein the communication device is further configured to:

present a comparison of the alternative one and the selected one of the one or more insurance coverage packages.

4. The computer system of claim 1, wherein the at least two individual policy features of the selected one of the one or more insurance coverage packages further include one or more of a no-drop promise feature, a reimbursement for home services features, a lifetime guarantee for repair services feature, a roadside assistance feature and a new car replacement guarantee feature.

5. The computer of claim 1, wherein the at least two individual policy features of the selected one of the one or more insurance coverage packages further include one or more of a 12-month policy feature, a first accident forgiveness feature, and a disappearing deductible feature.

6. The computer system of claim 1, wherein the at least two individual policy features of the selected one of the one or more insurance coverage packages further include one or more of a no-drop promise feature, a reimbursement for home services features, a lifetime guarantee for repair services feature, a roadside assistance feature, a new car replacement guarantee feature, a 12-month policy feature, a first accident forgiveness feature, and a disappearing deductible feature.

7. The computer system of claim 1, wherein the at least two individual policy features of the selected one of the one or more insurance coverage packages further include one or more of a full cost to rebuild a home feature, a payment for the actual cost of replacing possessions feature, and a deductible forgiveness feature.

8. The computer of claim 7, wherein the at least two individual policy features of the selected one of the one or more insurance coverage packages further include one or more of a 12-month policy feature, a first accident forgiveness feature, and a disappearing deductible feature.

9. A computer-implemented method for processing data relating to one or more insurance policies, the method comprising:

retrieving, by one or more computer processors, insurance coverage data from a data storage device, wherein the insurance coverage data includes, for each of a plurality of individual policy features, a corresponding feature identifier and a set of rules defining a compatibility of each of the plurality of individual policy features to one or more other individual policy features;

receiving, by said one or more computer processors, a policy request from an individual, and identifying at least two individual policy features from among the plurality of individual policy features based on (i) said policy request from said individual and (ii) a determination of the compatibility of said at least two individual policy features in the insurance coverage data based on said set of rules, wherein at least one of the individual policy features comprises a single deductible feature;

assembling, by said one or more computer processors and responsive to said policy request and based on said set of rules, one or more insurance coverage packages including said at least two individual policy features; and generating, by said one or more computer processors, based on the at least two individual policy features, pricing information for each of the one or more insurance coverage packages;

presenting, by a communication device coupled to the one or more computer processors, the generated one or more insurance coverage packages;

receiving, by the communication device coupled to the one or more computer processors, a selection of a selected one of the one or more insurance coverage packages;

storing, in a policy record data storage device coupled to the one or more computer processors, a policy record associated with the selected insurance coverage package, wherein the selected insurance coverage package is a first insurance policy and wherein the selected insurance coverage package has an associated first deductible;

associating, in the policy record data storage device coupled to the one or more computer processors, the policy record associated with the selected insurance coverage package with a policy record associated with a second insurance policy, wherein the second insurance policy has an associated second deductible and wherein the selected insurance coverage package and the second insurance policy are for different property types; and responsive to receiving an insurance claim involving a single loss event that results in property damage to the property type covered by the selected insurance coverage package and in property damage to the property type covered by the second insurance policy:

determining, by said one or more computer processors, a single deductible for the single deductible feature to apply based upon the first deductible and the second deductible; and updating, by said one or more computer processors, the policy records associated with each of the selected insurance coverage package and the second insurance policy based on said determined single deductible.

10. The method of claim 9, wherein each feature identifier is associated with one or more pricing rules, and wherein generating pricing information for each of the one or more insurance coverage packages is further based on said one or more pricing rules associated with the at least two individual policy features identified in the policy request.

11. The method of claim 9, further comprising: responsive to receiving the selection of the selected one of the one or more insurance coverage packages:

determining an alternative one of the one or more insurance coverage packages; and presenting a comparison of the alternative one and the selected one of the one or more insurance coverage packages.

12. The method of claim 9, wherein the at least two individual policy features of the selected one of the one or more insurance coverage packages further include one or more of a no-drop promise feature, a reimbursement for home services feature, a lifetime guarantee for repair services feature, a roadside assistance feature, and a new car replacement guarantee feature.

13. The method of claim 9, wherein the at least two individual policy features of the selected one of the one or more insurance coverage packages further include one or more of a 12-month policy feature, a first accident forgiveness feature, and a disappearing deductible feature.

14. The method of claim 9, wherein the at least two individual policy features of the selected one of the one or more insurance coverage packages further include one or more of a no-drop promise feature, a reimbursement for home services feature, a lifetime guarantee for repair services feature, a roadside assistance feature, a new car replacement guarantee feature, a 12-month policy feature, a first accident forgiveness feature, and a disappearing deductible feature.

15. The method of claim 9, wherein the at least two individual policy features of the selected one of the one or more insurance coverage packages further include one or more of a full cost to rebuild a home feature, a payment for the actual cost of replacing possessions feature, and a deductible forgiveness feature.

16. The method of claim 15, wherein the at least two individual policy features of the selected one of the one or more insurance coverage packages further include one or more of a 12-month policy feature, a first accident forgiveness feature, and a disappearing deductible feature.

17. A non-transitory computer readable medium having stored therein instructions that, upon execution, cause one or more computer processors to:
retrieve insurance coverage data from a data storage device coupled to the one or more computer processors, wherein the insurance coverage data includes, for each of a plurality of individual policy features, a corresponding feature identifier and a set of rules defining a compatibility of each of the plurality of individual policy features to one or more other individual policy features;
receive, by the one or more computer processors, a policy request from an individual, and identify at least two individual policy features from among the plurality of individual policy features based on (i) said policy request from said individual and (ii) a determination of the compatibility of said at least two individual policy features in the insurance coverage data based on said set of rules, wherein at least one of the individual policy features comprises a single deductible feature;
assemble, by the one or more computer processors and responsive to said policy request and based on said set of rules, one or more insurance coverage packages including said at least two individual policy features; and
generate, by the one or more computer processors and based on the at least two individual policy features, pricing information for each of the one or more insurance coverage packages;
present, by a communication device coupled to the one or more computer processors, the generated one or more insurance coverage packages;
receive, by the communication device coupled to the one or more computer processors, a selection of a selected one of the one or more insurance coverage packages;
store, in a policy record data storage device coupled to the one or more computer processors, a policy record associated with the selected insurance coverage package, wherein the selected insurance coverage package is a first insurance policy and wherein the selected insurance coverage package has an associated first deductible;
associate, in the policy record data storage device coupled to the one or more computer processors, the policy record associated with the selected insurance coverage package with a policy record associated with a second insurance policy, wherein the second insurance policy has an associated second deductible and wherein the selected insurance coverage package and the second insurance policy are for different property types; and
responsive to receiving an insurance claim involving a single loss event that results in property damage to the property type covered by the selected insurance coverage package and in property damage to the property type covered by the second insurance policy:
determine a single deductible for the single deductible feature to apply based upon the first deductible and the second deductible; and
update the policy records associated with each of the selected insurance coverage package and the second insurance policy based on said determined single deductible.

18. The non-transitory computer readable medium of claim 17, wherein each feature identifier is associated with one or more pricing rules, and wherein generating pricing information for each of the one or more insurance coverage packages is further based on said one or more pricing rules associated with the at least two individual policy features identified in the policy request.

19. The non-transitory computer readable medium of claim 17, having further instructions that, upon execution, cause the one or more computer processors to:
responsive to receipt of the selection of the selected one of the one or more insurance coverage packages:
determine an alternative one of the one or more insurance coverage packages; and
present a comparison of the alternative one and the selected one of the one or more insurance coverage packages.

20. The non-transitory computer readable medium of claim 17, wherein the at least two individual policy features of the selected one of the one or more insurance coverage packages further include one or more of a no-drop promise feature, a reimbursement for home services feature, a lifetime guarantee for repair services feature, a roadside assistance feature, and a new car replacement guarantee feature.

21. The non-transitory computer readable medium of claim 17, wherein the at least two individual policy features of the selected one of the one or more insurance coverage packages further include one or more of a 12-month policy feature, a first accident forgiveness feature, and a disappearing deductible feature.

22. The non-transitory computer readable medium of claim 17, wherein at least two individual policy features of the selected one of the one or more insurance coverage packages further include one or more of a no-drop promise feature, a reimbursement for home services feature, a lifetime guarantee for repair services feature, a roadside assistance feature, a new car replacement guarantee feature, a 12-month policy feature, a first accident forgiveness feature, and a disappearing deductible feature.

23. The non-transitory computer readable medium of claim 17, wherein the at least two individual policy features of the selected one of the one or more insurance coverage packages further include one or more of a full cost to rebuild a home feature, a payment for the actual cost of replacing possessions feature, and a deductible forgiveness feature.

24. The non-transitory computer readable medium of claim 23, wherein the at least two individual policy features of the selected one of the one or more insurance coverage packages further include one or more of a 12-month policy feature, a first accident forgiveness feature, and a disappearing deductible feature.

\* \* \* \* \*